FAULT LOCATING FOR RADIO RELAY SYSTEMS

Filed Sept. 12, 1946 4 Sheets-Sheet 1

INVENTORS
DONALD S. BOND
GERALD G. GERLACH
LELAND E. THOMPSON
BY H. G. Grover
ATTORNEY July 11, 1950 D. S. BOND ET AL 2,514,367

FAULT LOCATING FOR RADIO RELAY SYSTEMS

Filed Sept. 12, 1946 4 Sheets-Sheet 2

Fig. 3 (TERMINAL STATION)

INVENTORS
DONALD S. BOND
GERALD G. GERLACH
LELAND E. THOMPSON

BY H. G. Grover

ATTORNEY

INVENTORS
DONALD S. BOND
GERALD G. GERLACH
BY LELAND E. THOMPSON
H. G. Grover
ATTORNEY INVENTORS
DONALD S. BOND
GERALD G. GERLACH
LELAND E. THOMPSON
BY H. G. Grover
ATTORNEY Patented July 11, 1950

2,514,367

UNITED STATES PATENT OFFICE 2,514,367

FAULT LOCATING FOR RADIO RELAY SYSTEMS

Donald S. Bond and Gerald G. Gerlach, Philadelphia, Pa., and Leland E. Thompson, Merchantville, N. J., assignors to Radio Corporation of America, a corporation of Delaware Application September 12, 1946, Serial No. 696,566

18 Claims. (Cl. 250—15)

In the copending application of Leland E. Thompson Serial No. 576,453, filed February 6, 1945 there is described an ultra short wave radio relaying system. Economies of operation are effected by virtue of the fact that, among other things, operators need be in attendance only at the relay system terminal stations. The intermediate stations, for example, the ten radio relaying stations which may be required for a signaling system 300–400 miles long, are unattended. Should a circuit failure occur in one of the unattended intermediate relaying stations, it is important to determine promptly where the fault occurs and also the general nature of the failure. Accordingly, it is an object of this invention to provide an improved fault locating system and apparatus for such radio relaying systems.

Briefly, in carrying out the present invention a test tone is transmitted over a service channel from either or both of the terminal stations of the radio relaying system. Each terminal station, as will be explained more fully later, makes use of a terminal transmitter and a terminal receiver enabling two-way or duplex signaling. The terminal operator at each terminal station checks successively on audio tones such as 400, 525, 660, 850 cycles, etc., each of these tones being a test tone for one of the relaying stations of the chain. If the tone is returned to the terminal station operator automatically on each test he has ascertained that the system is unbroken out to that particular radio relay station adjusted for the particular test tone transmitted. Should there be no response on one of the assigned test tones, this will identify the station in trouble.

Also, as will be explained more fully later, modulations carried by the returned tone will indicate whether a transmitter at the relaying station is on frequency and, further, in accordance with the invention the returned tone will indicate other abnormal conditions such as transfer of the equipment at the relaying station to an auxiliary primary power supply, improper operation of automatic starting gasoline engine generators, fire alarms, burglar alarms, etc.

Figure 1:
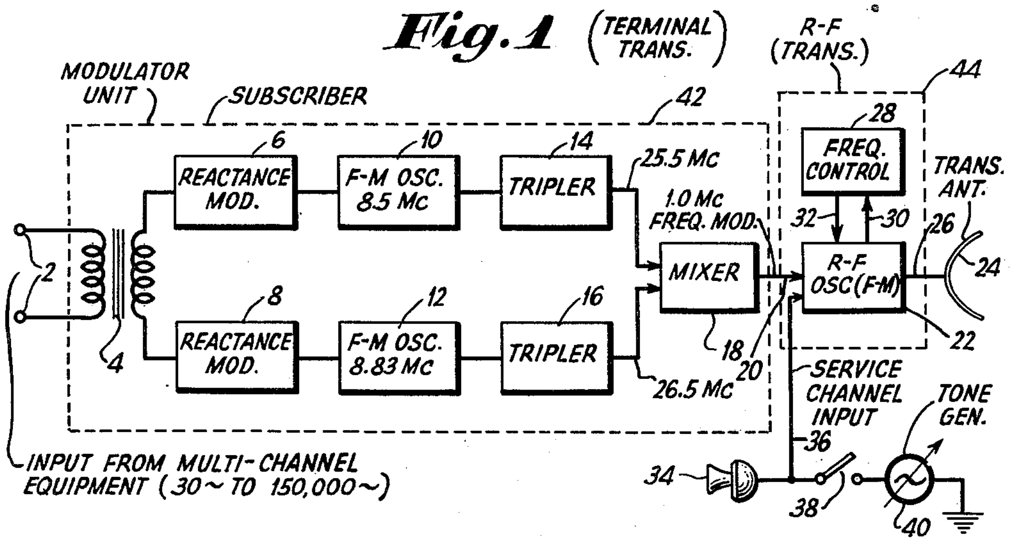

Turning to Figure 1, which represents a terminal transmitter of a relaying system such as described in the copending application of Leland E. Thompson before referred to, a very broad band of communication frequencies, such as 30 cycles to 150,000 cycles, is fed through transformer 4 to the reactance tube modulators 6, 8. This broad band enables the transmission of all frequencies from the lowest commonly required in high fidelity network service to the highest required for the full carrier telephone range. In short, it covers all parts of the spectrum utilized by conventional telephone circuits over wire lines. Thus, this band enables the handling of some 32 telephone circuits or over 1,000 teleprinter circuits, each at 60 words per minute.

The reactance tube modulators 6, 8 oppositely vary the oscillators 10, 12 each having a mean frequency of operation of, for example, 8.5 mc. and 8.83 mc. The outputs of the oscillators 10, 12 are tripled by frequency triplers 14, 16 and the outputs of the triplers are combined in a heterodyning mixer 18. In the absence of signal input at terminals 2, the output of mixer 18 is a one mc. sub-carrier wave. In the presence of signals at terminals 2 this one mc. sub-carrier wave, as fed through line 20 to the high frequency oscillator 22, may be varied in frequency as much as, for example, plus and minus 200 kc. at such times when all channels fed through terminals 2 are instantaneously additive.

The oscillator 22 may operate, for example, at a mean frequency of 4,000 mc. and may be varied in frequency by the sub-carrier fed through line 20 an amount such as plus and minus two million cycles. The frequency modulated output of the high frequency oscillator 22 is fed through a wave chute or transmission line 26 to a horn antenna 24 or to a dipole antenna provided with a parabolic reflector, as described in greater detail in the above-referred to application of L. E. Thompson.

The high frequency oscillator 22 also feeds part of its output through line 30 to frequency controlling apparatus 28 which generates a frequency controlling voltage which is fed back to the oscillator 22 through line 32. Typical frequency controlling systems for this purpose are described in the copending applications of Leland E. Thompson Serial No. 671,454, filed May 22, 1946, now Patent No. 2,462,294, granted February 22, 1949 and Orville E. Dow, Serial No. 451,717, filed July 21, 1942, now Patent No. 2,404,568, granted July 23, 1946. As explained in these copending applications, when the oscillator 22 is "on" frequency a 120 cycle tone is generated by, and fed into line 32 from the frequency controlling apparatus and when the oscillator 22 is "off" frequency a 60 cycle tone component will be fed in line 32 from apparatus 28. Frequency controlling apparatus of this nature is used at each relaying station and these 60 cycle and 120 cycle tone components are used at the relaying stations to modulate the tone returned at each relaying station so that the terminal operator can determine whether the relaying station transmitter is "on" or "off" frequency.

In the Thompson application Serial No. 671,454 the 60 and 120 cycle voltages appear at and may be taken from resistor 16 and in the Dow application they appear at and may be taken from transformer T of Fig. 1.

The high frequency oscillator 22 is not only modulated with the frequency modulated sub-carrier fed through line 20, but is also modulated by a service channel represented by microphone 34 and line 36. This service channel passes a band of frequencies of from, for example, 30 to 3,000 cycles which, in short, is a typical band of frequencies used in telephony.

When the operator at the terminal transmitter wishes to test the relaying system, switch 38 is closed so that tones from the variable frequency tone generator 40 may be fed through the service channel line 36 to directly frequency modulate the output of microwave radio frequency carrier generator 22. Tone generator 40, for example, may be varied in ten steps by the operation of suitable switches so as to develop and feed into line 36, selectively, one of ten different audio frequencies such as, for example, 400 cycles, 525 cycles, 660 cycles, 850 cycles, etc.

The operator at the terminal transmitter is provided with apparatus for checking the various components and the overall operation of both the terminal transmitter and terminal receiver, both of which form a terminal station under immediate control of the terminal station operator. Switching in of the tone generator 40 by means of switch 38 is solely for the purpose of checking and locating faults of the relaying stations of the radio relaying chain.

Figure 2:
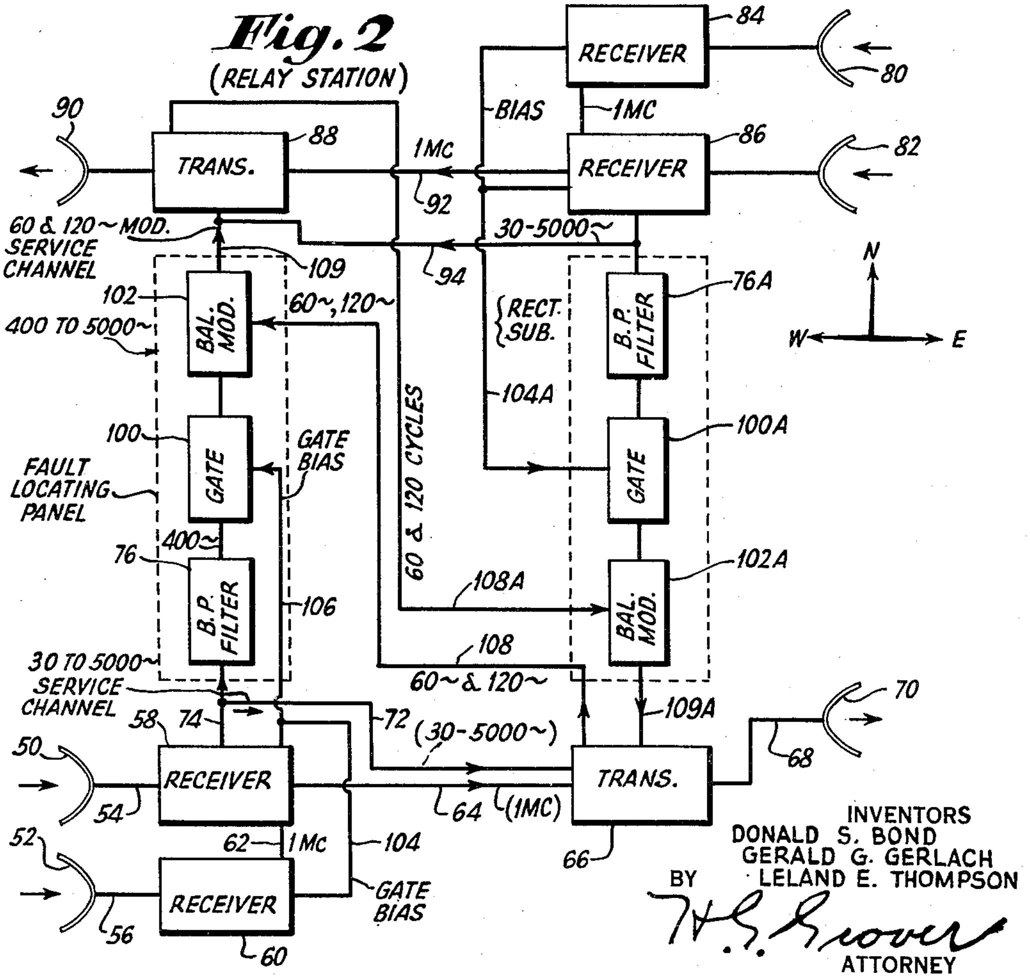

In Fig. 2 is illustrated schematically, and in block diagram form, a typical radio relaying station having incorporated therein fault locating equipment in accordance with the present invention.

Waves such as transmitted from a terminal transmitter of Fig. 1 or from an immediately preceding relaying station are received upon the receiving antenna systems 50, 52 of Fig. 2 which may be of the type described in the copending application of L. E. Thompson, Serial Number 576,453, filed February 6, 1945. As described in greater detail in the copending application of D. S. Bond and L. E. Thompson, Serial Number 653,726, filed March 12, 1946, the two antennas 50, 52 are separated by a distance of perhaps 50 feet in a vertical plane and are connected by transmission lines 54, 56 to identical receivers 58, 60 all of which apparatus forms a diversity receiving system to overcome certain types of fading existing on microwaves.

Receiver 58 and its antenna 50 may be the upper receiving system and 60 the lower receiver. Each receiver subjects the received waves to a single frequency demodulation process as a result of which the 1 megacycle frequency modulated sub-carrier appearing in line 20 of Fig. 1 is reproduced at each relay station. This 1 megacycle sub-carrier output of each receiver is combined by means of connection 62 and fed through transmission line 64 to the ultra high frequency transmitter 66 for retransmitting the signals further to the east. To this end also, transmission line 68 and radiating antenna system 70 are employed.

It should also be noted that in the output of the receivers there appears the service channel output, namely, a band of audio frequencies from about 30 to 5000 cycles in line 74 which also is fed through line 72 to transmitter 66 in order to modulate the output of transmitter 66 with the service channel as well as by the frequency modulated sub-carrier in line 64.

Similarly in going from east to west, at the relay station of Fig. 2, the signals are picked up and retransmitted by a duplicate set of apparatus including pick up antenna systems 80, 82, diversity receivers 84, 86, transmitter 88 and the transmitting antenna system 90. The 1 megacycle sub-carrier connection between receivers 84 and 86 and transmitter 88 is represented by line 92 and the service channel connection to the transmitter 88 is given by line 94. As explained in the copending application of L. E. Thompson, the 1 megacycle sub-carrier channel and the audio frequency service channel are combined and applied to the negatively biased plate of a reflex type of Klystron oscillator in order to frequency modulate the output thereof. The latter is, of course, radiated as frequency modulated microwaves over such transmitting antenna systems as 70 and 90 of Fig. 2.

There is provided at each relay station, as shown in Fig. 2, for fault finding purposes, band pass filters 76 and 76A, gates 100 and 100A and balanced modulators 102 and 102A.

Assuming that the relaying station of Fig. 2 has been assigned the fault tone frequency of 400 cycles per second then band pass filter 76 is designed to pass that frequency. Gate 100 is preferably in the form of a vacuum tube the bias of which, as will be explained in greater detail later, is derived by combined, separately rectified portions of the 1 megacycle sub-carrier output of receivers 58, 60. When both receivers 58 and 60 are properly operating, this bias, as set up in lines 104 and 106, is sufficient to permit the gating tube system 100 to become conductive and thereby permit the 400 cycle tone appearing at the output terminals of band pass filter 76 to pass through the gate into the balanced modulator 102.

The output of the balanced modulator is also modified by 60 cycle or 120 cycle waves fed through line 108. These two frequencies are derived from the automatic frequency controlling apparatus provided for transmitter 66. This frequency controlling apparatus described in greater detail in the copending application of L. E. Thompson, Serial Number 576,453, filed February 6, 1945, and in the copending application of O. E. Dow, Serial Number 451,717, now U. S. Patent 2,404,568, provides a 120 cycle tone when the transmitter 66 is "on frequency" and a 60 cycle tone when it is "off frequency." The 400 cycle tone modulated by 60 cycles or 120 cycles or both is fed through line 109 in parallel with the service channel 94 to frequency modulate the output of transmitter 88.

In this way the tone assigned to the relay station is returned to the operator transmitting it at the terminal station. The operator can tell by the presence or absence of the tone and by the modulation thereon, namely, 60 cycle or 120 cycle waves or both, as to the operating condition of the apparatus so far described at the radio relaying station.

In a similar way an operator at an easterly terminal station with respect to the relay system of Fig. 2 may send out a test tone by microwaves to the diversity receiving system 80, 84, 82, 86. The rectified sub-carrier in line 104A controls gate 100A which in turn blocks or permits passage of the tone passed by band pass filter 76A. Also, the balanced modulator 102A is provided with tone from gate 100A and 60 cycle or 120 cycle tones by way of line 108A connected to the automatic frequency controlling equipment of transmitter 88. The test tone sent by the operator located to the east is returned to him by way of transmitter 66 and radio relaying transmitting antenna system 70.

Figure 3:
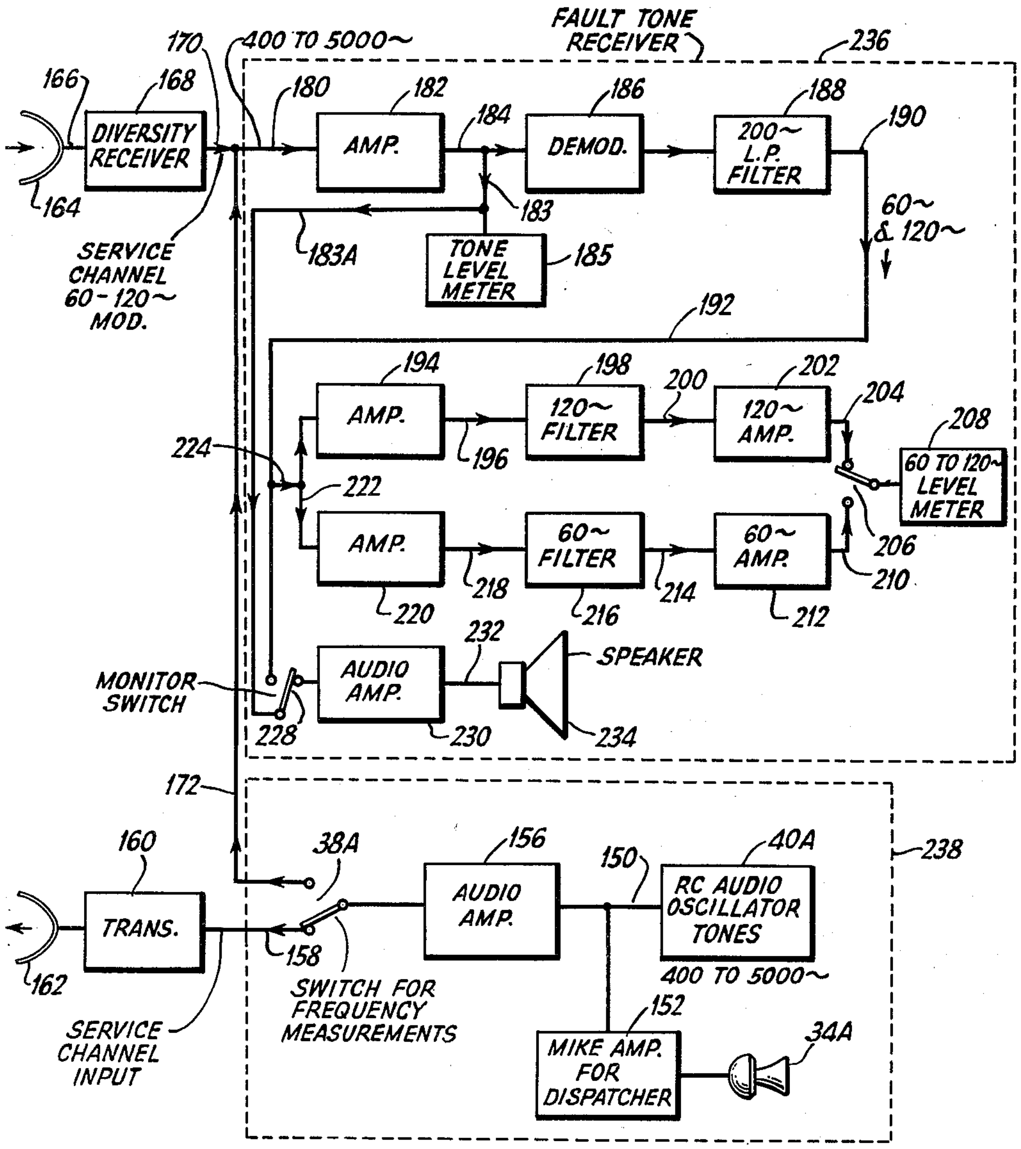

Fig. 3 shows schematically a terminal station and the components thereat for fault locating and testing. Suppose, for example, it is desired to test the relay station of Fig. 2, it being assumed that the terminal station of Fig. 3 is located to the west of Fig. 2. Assume further that the band pass filter 76 of Fig. 2 is designed to pass a test tone of 400 cycles.

The resistance capacity audio oscillator 40A of Fig. 3, corresponding to the test tone generator 40 of Fig. 1, is adjusted or tuned to generate a 400 cycle tone. This 400 cycle tone is fed through line 150 of Fig. 3, audio amplifier 156, switch 38A in its lower position and over wire line 158 to the transmitting terminal or transmitter 160. It should be noted that wire line 158 corresponds in general to wire line 36 of Fig. 1 and that transmitter 160 of Fig. 3 includes all of the apparatus within the two dotted rectangles of Fig. 1. As a consequence the transmitting antenna system 162 radiates as a modulation of the carrier the 400 cycle tone generated at 40A of Fig. 3 to the diversity receiving system 50, 52, 54, 56, 58, 60 of Fig. 2.

If conditions are correct and the apparatus is in good working operation at the relaying station the rectified sub-carrier voltage injected in line 106 will open gate 100 and permit the 400 cycle tone to pass into the balanced modulator 102. Also, if transmitter 66 of Fig. 2 is on frequency the 120 cycle audio note from the A. F. C. system forming part of transmitter 66 of Fig. 2 will modulate the 400 cycle tone. This modulated 400 cycle tone will be fed through line 109 of Fig. 2 to transmitter 88 and be transmitted on the carrier radiated from the antenna system 90 of Fig. 2 back to the diversity receiving system of the terminal station of Fig. 3. This diversity receiving system is diagrammatically illustrated by the antenna system 164 coupling transmission line 166 to the receiving apparatus 168.

The output of the service channel 170 of the receiving system 168 will be fed through line 180 to the tone amplifier 182 of Fig. 3. Part of the tone is fed through line 184 and line 183 to the tone level meter 185 which tone, if of a predetermined level will indicate that both diversity receivers 58 and 60 of Fig. 2 are operating properly.

Another portion of the tone appearing in line 184 of Fig. 3 is fed to a demodulator or detector 186 the detected output of which is fed to a 200 cycle low pass filter 188. As a result there will appear in line 190 tones having frequencies of 60 cycles and 120 cycles if the 400 cycle tone at the relay station has been modulated by such frequencies as derived from the automatic frequency controlling system of transmitter 66 of Fig. 2. Assuming that this transmitter is "on" frequency then the output appearing in line 190 of Fig. 3 will be a 120 cycle note which will be fed through lines 192 and 224, amplifier 194, line 196, filter 198, line 200, 120 cycle amplifier 202, line 204 and through switch 206 to a tone level meter 208.

Similarly, the 60 cycle tone if it appears in the output of demodulator 186 will be fed through amplifier 220, 60 cycle filter 216, amplifier 212, line 210 and switch 206, in its other or lower position, to the tone level meter 208.

If meter 208 with switch 206 in its upper position registers a substantial reading of 120 cycle tone and has a small reading when the switch 206 is in its lower position when the 60 cycle tone is being measured then it will be known that the transmitter 60 of Fig. 2 will be "on" frequency. On the other hand if the 60 cycle component is substantial then it will be known that the transmitter 66 of Fig. 2 will be "off" frequency and will require readjustment.

During normal operation of the system when no test tones are sent over the relay chain, switch 228 is left in its lower position as shown in Fig. 3. Then if a warning tone corresponding to one of the fault tones assigned to the relay manifests itself in speaker 234 then it will be known that at some relay station, as will be explained more fully later, an auxiliary tone oscillator has been thrown into circuit as a result of an undesired operating condition. This warning tone is fed to the loudspeaker 234 of Fig. 3 by way of line 183A, switch 228, audio amplifier 230, line 232 and speaker 234. The terminal operator may have a musical ear and recognize the frequency of the note and, therefore, the relay station at which trouble is occurring.

If not, in order to determine the frequency of the note and hence the relay station to which that frequency has been assigned, the terminal operator throws switch 38A of Fig. 3 to its upper position and switches audio oscillator 40A through its different frequencies of operation. Oscillator 40A is provided with a calibrated dial so that the operator knows the frequency of operation of this oscillator. When a frequency is reached which is in tune with the warning tone being received over loudspeaker 234, then, of course, the operator will know at what station the trouble is occurring.

It should be noted in Fig. 3 that lines 158 and 172 may be long land lines and that the apparatus within rectangle 238 may be located some distance from the transmitter and receiver 160 and 168 respectively.

After testing, the audio oscillator 40A is shut off as a result of which the service channel for voice communication may be operated. In that event the operator speaks through microphone 34A of Fig. 3 the output of which is amplified by amplifiers 152 and 156 and transmitted over line 158 to the transmitter 160 as explained in the copending application of L. E. Thompson, Serial Number 576,453, filed February 6, 1945.

By way of example, the transmitter 160 of Fig. 3 may have assigned to it a mean frequency of operation of 4000 megacycles and the transmitter 88 of Fig. 2 may have assigned to it a frequency of operation of 4010 megacycles.

Figures 4, 5:
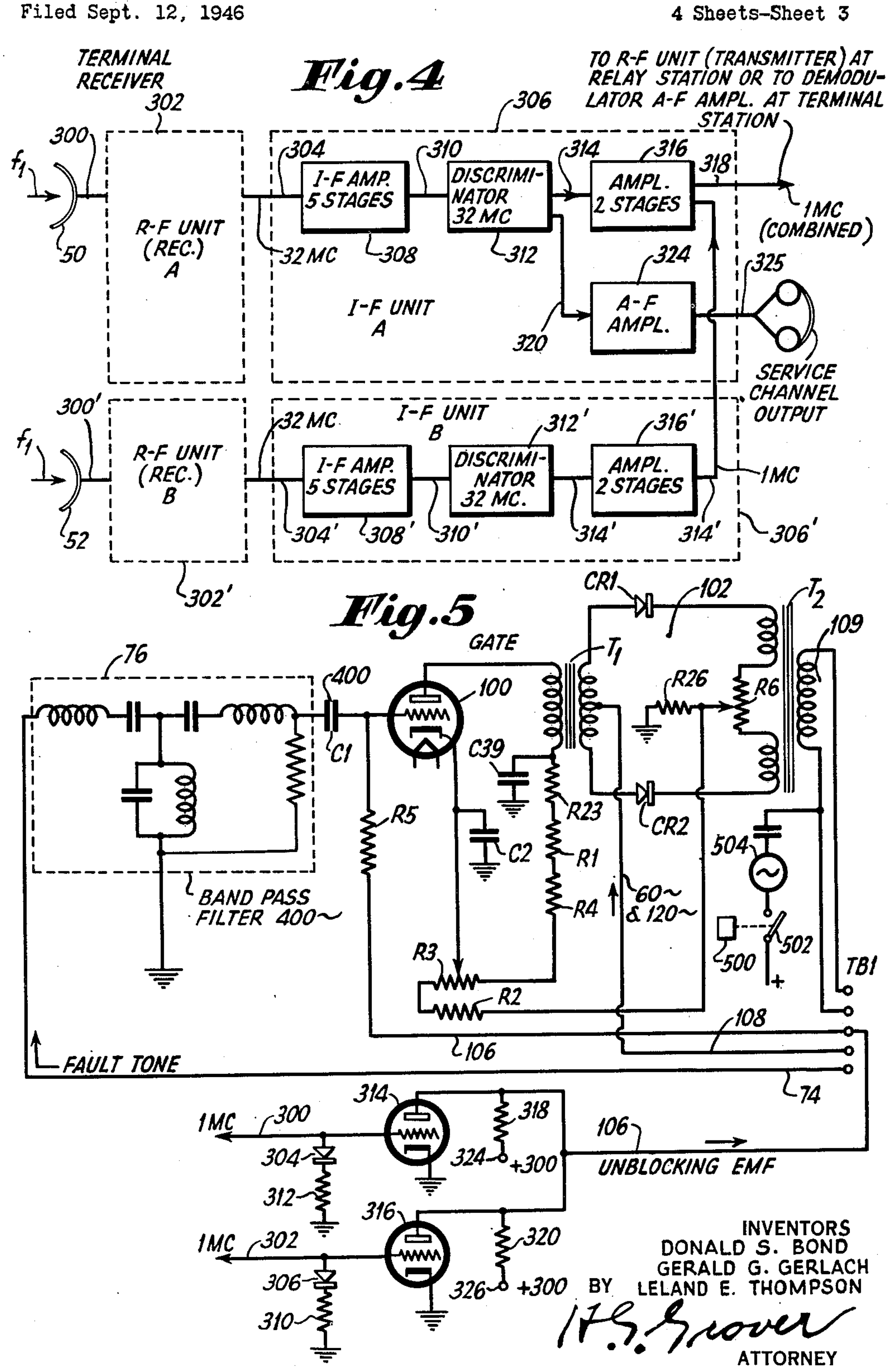

The receiver 58 of Fig. 2 is diagrammatically illustrated in somewhat greater detail at dotted rectangles 302 and 306 in Fig. 4. The individual receiving system is, of course, identical to that shown in the copending application of Leland E. Thompson, Serial Number 576,453, filed February 6, 1945.

The receiving antenna system 50 feeds the received waves through line 300 to an r. f. unit 302. This unit includes an automatically frequency controlled oscillator, the output of which is fed to a crystal mixer together with the received waves fed through line 300. The output of the crystal mixer is fed to an intermediate frequency amplifier whose output, for example, may have a mean frequency of 32 mc. which, in turn, is fed through line 304 of Fig. 4 to further intermediate frequency amplifier stages 308. The output of the latter stages is fed to a discriminator detector 312 in whose output there appears in line 314 the frequency modulated one mc. sub-carrier which is amplified in amplifier 316 and fed for utilization through line 318.

There also appears in the output of the discriminator 312 of Fig. 4 the service channel band of frequencies which band is fed through line 320 to the audio amplifier 324 to the service channel output line 325 and utilized as desired.

For diversity reception, for example, as represented by the second receiver 60 of Fig. 2, a duplicate system is provided which, as shown in Fig. 4, is indicated by the primed letters. The sub-carrier frequency output derived from the lower diversity antenna 52 is fed through line 314' to amplifier 316 and is combined with the frequency modulated sub-carrier derived from line 314, as described more fully in the copending application of Donald S. Bond and Leland E. Thompson, Serial Number 653,726, filed March 12, 1946.

In Fig. 5 there is shown in wiring diagram form and, hence, in greater detail the band pass filter-gate-balanced modulator arrangement, such as shown at 76, 100 and 102 of Fig. 2.

The fault indicating tone, such as a note having a frequency of 400 cycles, is fed through line 74 to the band pass filter 76 designed to pass the particular frequency assigned to the particular relay station under consideration. The tone is fed through condenser 400 to the grid of the gating tube 100. The grid of this gating tube is normally maintained at such potential as to cause plate current cut-off of the gate.

The gate is made conductive and allowed to pass the tone from filter 76 into the balanced modulator 102 by virtue of the unblocking potential applied through lead 106. This unblocking potential is derived in the following way:

A part of the frequency modulated one mc. sub-carrier from the upper diversity receiver of Fig. 2 is fed through germanium or copper oxide rectifier 304 in order to develop a rectified sub-carrier voltage across resistor 312.

Similarly, the frequency modulated one mc. sub-carrier of the lower receiver is fed through rectifier 306 in order to develop a rectified voltage across resistor 310. These rectified voltages appearing across resistors 310 and 312 control the grid potential and, hence, the plate current flow through tubes 314 and 316. The plates of these tubes are supplied with positive potential from, say, 300 volt terminals 324 and 326 through resistors 318 and 320. Under normal operating conditions with both receivers supplying the same output, adjustments are made so that the voltage in lead 106 is +150 volts, or more generally, it is made to equal that voltage which is sufficient to unblock gate 100.

In the event that one receiver fails to operate, the voltage in lead 106 will drop, as a result of which gate tube 100 will be blocked.

Assuming normal operation with the required 150 volts applied through lead 106 to unblock tube 100, 400 cycle tone passed by the filter 76 will be fed through the transformer T1 to the copper oxide rectifiers or modulators CR1 and CR2. There is also fed through lead 108 to the balanced modulator system of Fig. 5, as explained in connection with Fig. 2, 60 cycle or 120 cycle components depending upon the operation of the A. F. C. system for the transmitter 66 of Fig. 2.

In the output line 109 of Fig. 5, corresponding to line 108 of Fig. 2, there will appear the 400 cycle tone modulated by the 120 cycle or 60 cycle voltage derived from the A. F. C. system of the relay station transmitter 66 of Fig. 2.

In addition, as shown in Fig. 5, there is provided a relay 500 operating switch 502. When switch 502 is closed, it energizes the resistance condenser oscillator 504 to which a predetermined tone frequency has been assigned. The relay 500 is operated at the relay station under an abnormal condition such as transfer of the equipment at the relaying station to an auxiliary primary power supply, improper operation of automatic starting gasoline engine generators, fire alarms, burglar alarms, etc. This tone is fed to either the service channel or to the line 109, as indicated, and will produce an indication in the terminal station loudspeaker 234 (Fig. 3) when relay 500 goes into operation.

Figure 6:
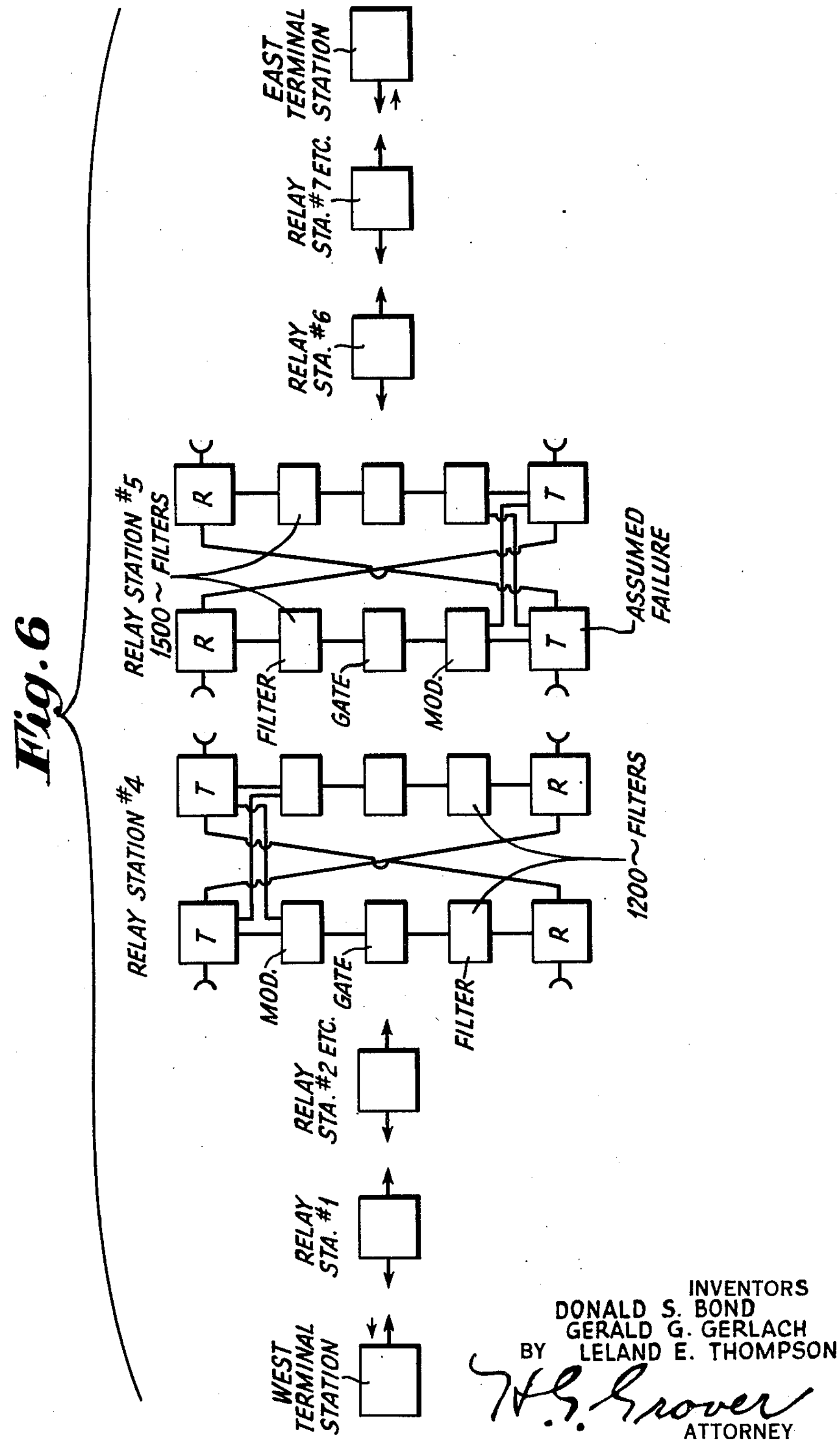

By reference to Fig. 6, the manner in which the radio relay system of the present invention may be tested from both ends of the circuit so as to more precisely locate the point at which failure occurs, may readily be understood. As shown in Fig. 6, assume that the relay system is composed of an East terminal station, a West terminal station and seven or more intermediate relay stations. Assume that the E-W transmitter-oscillator tube at relay station #5 has failed. Also, assume that the filter frequency of this relay station is 1500 cycles. The testing operator at the East terminal station will receive back the tone of each relay station in turn and will derive the 120 cycle modulation until radio relay station #5 is reached. The 1500 cycle tone of this station will be received but the 120 cycle modulation will be missing. The East terminal station operator then knows the exact location of the failure.

The West terminal station operator will find everything normal through relay station #4 but he will not receive the 1500 cycle tone back from station #5. The West terminal station operator, therefore, will not know whether the failure is in the E-W receiver at relay station #4 or the E-W transmitter at relay station #5. A repair man may be dispatched from either terminal. If from the East, he will, of course, know the exact location of the failure.

What is claimed is:

1. The method of testing a radio relaying station from a test point which includes transmitting radio waves modulated with a tone to the relaying station from the testing point, demodulating the waves to produce the tone at the relaying station, gating the amplitude level of the tone so produced in accordance with radio receiving conditions at the relaying station, frequency modulating a carrier with the controlled tone, and transmitting the frequency modulated carrier to the testing point.

2. The method of testing a radio relaying station which includes, transmitting high frequency waves modulated with a test tone from a testing point to the relaying station and automatically returning the test tone as derived by demodulating the received waves at the relaying station by frequency modulated waves to the testing point, the returned tone being gated in amplitude level in accordance with radio reception at the relaying station and being modulated with a locally generated wave of a frequency indicative of the operating condition of apparatus at the relaying station.

3. The method of testing a radio relaying station which includes, transmitting a test tone to the relaying station, automatically gating the amplitude level of the tone at the relaying station according to radio receiving conditions thereat, generating waves of predetermined frequency when normal and abnormal conditions exist at the relaying station, modulating the tone with the generated waves, and returning the modulated tone to the testing point.

4. The method of testing a radio relaying station from a test point which includes transmitting a tone to the relaying station, gating the amplitude level of the tone according to fading conditions at the relaying station, automatically modulating the tone with waves of predetermined frequencies when normal and abnormal conditions exist at the relaying station, and returning the modulated tone to the testing point.

5. The method of indicating operating conditions at an unattended radio relaying station which includes, deriving a test tone at the relaying station from received radio waves, gating the derived tone in accordance with a radio receiving condition at the station, and returning the gated tone to the point of test transmission.

6. The method of testing a radio relaying station of an unattended radio relaying system which includes, receiving, at a plurality of separated points at the relaying station, radio waves modulated with test tones, deriving the test tone from the received waves, rectifying portions of the received waves, combining the rectified portions, gating the derived tone with the combined rectified waves, returning the gated tone to the testing point, and measuring the amplitude of the returned gated tone.

7. The method of determining the condition of operation of a radio relaying station which includes, deriving a test tone from radio waves received at the station, gating the tone in accordance with radio receiving conditions at the station, modulating the gated tone with a locally generated wave indicative of the local condition of operation of apparatus at the relaying station, and returning the modulated gated tone to a testing point.

8. The method of testing a radio relaying station of an unattended radio relaying system which includes, receiving, at a plurality of separated points at the relaying station, radio waves modulated with test tones, deriving the test tone from the received waves, rectifying portions of the separately received waves, combining the rectified waves, gating the derived tone with the combined rectified waves, and transmitting the gated tone to a testing point.

9. In a radio relaying station, a plurality of radio receivers, circuits for deriving from the outputs of said receivers a test tone, circuits for rectifying outputs derived from said receivers and for gating the test tone in accordance with the combined rectified outputs, a transmitter at the relaying station, and circuits for modulating the output of the transmitter in accordance with the gated tones.

10. In a radio relaying station, a radio receiver, circuits for deriving from the output of said receiver a test tone, circuits for rectifying a part of the received radio waves and for gating the derived test tone in accordance with the rectified radio waves, a transmitter at the relaying station, and circuits for modulating the output of the transmitter in accordance with the gated tone.

11. An unattended radio relaying station comprising, a diversity receiving system for receiving angle modulated waves, means for deriving from the received angle modulated waves a test tone, a rectifier for rectifying a portion of the received frequency modulated waves, means to gate the test tone produced by the receiver with the rectified waves, a transmitter at the relaying station, circuits for producing relatively low frequency waves in response to a condition of operation of said transmitter, a modulator for modulating the gated test tone with said locally produced waves, and a second transmitter for transmitting the modulated tone.

12. An unattended radio relaying station comprising, a diversity receiving system for receiving modulated waves, means for deriving from the modulated waves a test tone, rectifiers for rectifying the received modulated waves, means for combining the outputs of said rectifiers and utilizing the combined outputs to gate the derived test tone, a transmitter at the relaying station, circuits for producing relatively low frequency waves in response to conditions of operation of said transmitter, a modulator for modulating the test tone with said locally produced waves, and a second transmitter for transmitting the modulated tone.

13. An unattended ultra short wave radio relaying station comprising, a diversity receiving system having vertically separated antennae for receiving frequency modulated waves, means for deriving from the frequency modulated waves a test tone, rectifiers for rectifying a portion of the received frequency modulated waves, means for combining the outputs of said rectifiers and utilizing the combined outputs to gate the derived test tone, a transmitter at the relaying station, circuits for producing relatively low frequency waves in response to the frequency of operation of said transmitter, a modulator for modulating the gated test tones with said locally produced waves, and a second transmitter for transmitting the modulated tones to a testing point.

14. An unattended radio relaying station comprising, a receiving system for receiving modulated waves, means for deriving from the modulated waves a test tone, rectifiers for rectifying the received modulated waves, means for utilizing the rectified output of the receiving system to gate the derived test tone, a transmitter at the relaying station, circuits for producing relatively low frequency waves in response to conditions of operation of said transmitter, a modulator for modulating the test tone with said locally produced low frequency waves, and a second transmitter for transmitting the modulated tone.

15. A relay station comprising east and west transmitters and ease and west receivers, a band pass filter, a gate and a modulator, in the order named, connecting the west receiver to the west transmitter, a band pass filter, a gate and a modulator, in the order named, connecting the east receiver to the east transmitter, a control voltage connection from the east transmitter to the west modulator and a control voltage connection from the west transmitter to the east modulator.

16. A relay station comprising east and west transmitters and east and west diversity receivers, a band pass filter, a gate and a balanced modulator, in the order named, connecting the common output circuit of the west diversity receiver to the west transmitter, a band pass filter, a gate and a balanced modulator, in the order named, connecting the east receiver to the east transmitter, a control voltage connection from the east transmitter to the balanced west modulator, and a control voltage connection from the west transmitter to the balanced east modulator.

17. A relay station comprising, east and west radio transmitting systems and east and west radio receiving systems, a band pass filter, a gate and a modulator, in the order named, connecting the west receiver to the west transmitter, a band pass filter, a gate and a modulator, in the order named, connecting the east receiver to the east transmitter, a control voltage connection from the east transmitting system to the west modulator, a control voltage connection from the west transmitter to the east modulator, a control voltage connection from the west receiver to the west gate, and a control voltage connection from the east receiver to the east gate.

18. A relay station comprising, east and west radio transmitting systems and east and west diversity radio receiving systems, a band pass filter, a gate and a balanced modulator, in the order named, connecting the west receiver to the west transmitter, a band pass filter, a gate and a balanced modulator, in the order named, connecting the east receiver to the east transmitter, means for supplying a control voltage derived from the east transmitting system to the west balanced modulator, means for supplying a control voltage derived from the west transmitter to the east balanced modulator, means for supplying a gating voltage derived from the west receiving system to the west gate, and means for supplying a gating voltage derived from the east receiver to the east gate.

DONALD S. BOND.
GERALD G. GERLACH.
LELAND E. THOMPSON.

REFERENCES CITED

The following references are of record in the file of this patent:

UNITED STATES PATENTS

| Number | Name | Date |
|---|---|---|
| 2,250,950 | Goldsmith | July 29, 1941 |
| 2,257,094 | Goldstine | Sept. 30, 1941 |
| 2,287,044 | Kroger | June 23, 1942 |
| 2,296,384 | Hansell | Sept. 22, 1942 |
| 2,334,189 | Goldstine | Nov. 16, 1943 |
| 2,345,951 | Smith | Apr. 4, 1944 |